(12) United States Patent
Gan et al.

(10) Patent No.: US 7,628,361 B2
(45) Date of Patent: Dec. 8, 2009

(54) ADJUSTABLE SUPPORT MECHANISM FOR DISPLAY DEVICES

(75) Inventors: Wen-Lin Gan, Shenzhen (CN); Jun-Wu Duan, Shenzhen (CN); Chang-Sheng Fan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 12/171,262

(22) Filed: Jul. 10, 2008

(65) Prior Publication Data

US 2009/0159760 A1 Jun. 25, 2009

(30) Foreign Application Priority Data

Dec. 20, 2007 (CN) .......................... 2007 1 0203279

(51) Int. Cl.
*A47J 47/16* (2006.01)
(52) U.S. Cl. ..................... 248/132; 248/162.1; 248/917
(58) Field of Classification Search ................. 248/121, 248/132, 161, 162.1, 404, 157, 421, 917, 248/919; 361/679.01, 679.02
See application file for complete search history.

(56) References Cited

U.S. PATENT DOCUMENTS

| 4,589,621 | A | * | 5/1986 | Hunt et al. | 248/421 |
| 7,185,867 | B2 | * | 3/2007 | Hill et al. | 248/421 |
| 2007/0217134 | A1 | * | 9/2007 | Shin | 361/681 |
| 2007/0262210 | A1 | * | 11/2007 | Oh et al. | 248/125.1 |

* cited by examiner

*Primary Examiner*—Ramon O Ramirez
(74) *Attorney, Agent, or Firm*—Zhigang Ma

(57) ABSTRACT

An exemplary adjustable support mechanism (50) includes a main bracket (51), an adjustable suspension member (52) slidably mounted to the main bracket and an elastic member (53). The main bracket forms at least two guide rails (516) including a first guide rail and a second guide rail disposed opposite to each other. The adjustable suspension member includes two crossed connected suspension frames (524, 525), at least two wheels (522) engaging the guide rails, and at least one stretching member (526, 527). The suspension frames are rotatably connected to each other. The at least two wheels are disposed at ends of the suspension frames. Two ends of each stretching member are connected to the suspension frames correspondingly. The elastic member has two ends fixed relative to the main bracket and the adjustable suspension member correspondingly.

14 Claims, 5 Drawing Sheets

ADJUSTABLE SUPPORT MECHANISM FOR DISPLAY DEVICES

BACKGROUND OF THE INVENTION

1. Field of the Invention

The present invention relates generally to support mechanisms for display devices, and more particularly to a support mechanism for a display device providing adjustable height.

2. Discussion of the Related Art

Currently, flat-panel display devices such as liquid crystal display (LCD) devices are widely used due to excellent display quality and thin profile. Typically, repositioning of the display device is accomplished via a support stand having an adjustable support mechanism.

Referring to FIG. 5, a typical adjustable support mechanism 100 for repositioning a flat-panel display device includes a support member 10, an elevating member 20, a spring 30, a shaft 31, and four fastening members 33, 36. The support member 10 includes a base plate 11 and two side plates 12 perpendicularly extending from opposite sides of the base plate 11. A flange 13 is formed around an end of each side plate 12 opposite to the base plate 11. The base plate 11, the side plates 12, and the flanges 13 cooperatively define a receiving groove 14 for receiving the elevating member 20. Two guide rails 15 are formed on the inner surfaces of the side plates 12 correspondingly. Each of the flanges 13 defines a fixing hole 16 adjacent at an end. The elevating member 20 is slidably mounted onto the support member 10. The elevating member 20 includes a connecting portion 21 for connecting the LCD panel on a top side, and defines two positioning holes 22 at a bottom side. The elevating member 20 forms two sliding portions 23 for engaging the guide rails 15. The shaft 31 defines two through holes 311 in opposite ends. An end of the spring 30 is sleeved on the shaft 31, and the other end of the spring 30 defines two through holes 32.

During assembly of the stand 100, the elevating member 20 is inserted into the support member 10. Each fastening member 33 extends through one corresponding through hole 311 of the shaft 31 and one corresponding fixing hole 16 of the flanges 13, thus fixing the shaft 31 to the support member 10. Each fastening member 36 extends through corresponding through hole 32 of the spring 30 and a corresponding positioning hole 22 of the elevating member 20, thus fixing the spring 30 to the elevating member 20. In use, the elevating member 20 can be slid on the support member 10 by external force. When the external force is removed, the liquid crystal display panel connected to the elevating member 20 can be set in a predetermined position, due to balanced weight of the liquid crystal display panel and the elevating member 20, elastic force of the spring 30, and friction force between the elevating member 20 and the support member 10.

However, a friction force between the elevating member 20 and the first housing 10 is great since the contacting area therebetween is large, requiring external force to move the elevating member 20 increased commensurately to overcome the friction force.

Therefore, an adjustable support mechanism for display devices to solve the problems described is desired.

SUMMARY

An exemplary adjustable support mechanism for a display includes a main bracket, an adjustable suspension member and an elastic member. The main bracket forms at least two guide rails including a first guide rail and a second guide rail opposite to each other. The adjustable suspension member is slidably mounted to the main bracket. The adjustable suspension member includes two crossed connected suspension frames, at least two wheels, and at least one stretching member. The suspension frames are rotatably connected to each other. The at least two wheels are disposed at ends of the suspension frames. Each of the first and second guide rails engages at least one wheel. Two ends of each of the at least one stretching member are connected to the suspension frames correspondingly. The at least one stretching member is configured for providing a pulling force to tightly engage the wheels with the guide rails of the main bracket. The elastic member has two ends fixed relative to the main bracket and the adjustable suspension member correspondingly.

Other advantages and novel features will become more apparent from the following detailed description when taken in conjunction with the accompanying drawings.

BRIEF DESCRIPTION OF THE DRAWINGS

The components in the drawings are not necessarily drawn to scale, the emphasis instead being placed upon clearly illustrating the principles of the adjustable support mechanism for display devices. Moreover, in the drawings, like reference numerals designate corresponding parts throughout the several views.

DETAILED DESCRIPTION OF THE EMBODIMENTS

Figure 1:
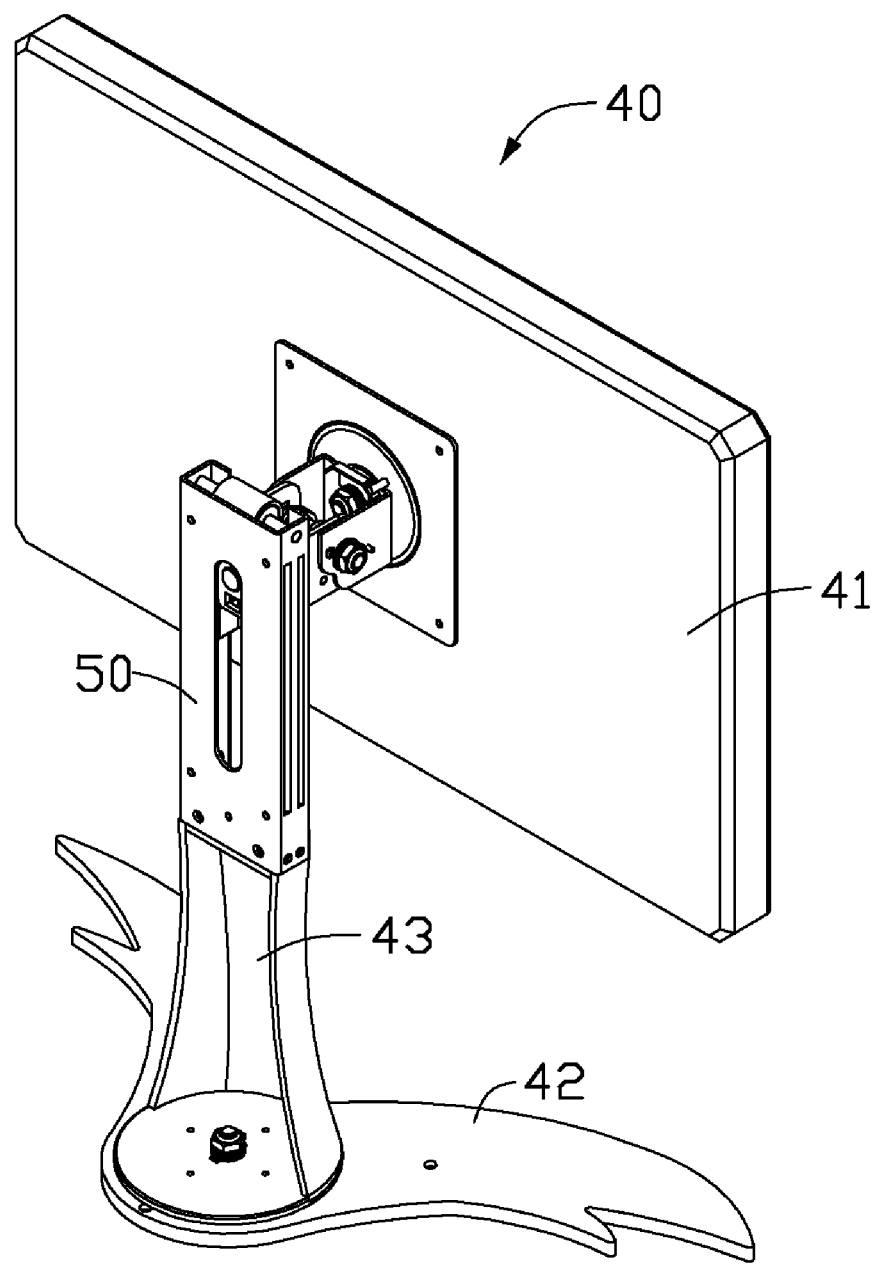
FIG. 1 is an assembled, isometric view of a liquid crystal display device having an adjustable support mechanism in accordance with a preferred embodiment.

An adjustable support mechanism according to an exemplary embodiment is applicable for use in a flat display device such as a liquid crystal display device. Referring to FIG. 1, a liquid crystal display device 40 includes a display screen 41, a base 42, a support frame 43 mounted on the base 42, and an adjustable support mechanism 50 connecting the support frame 43 and the display screen 41.

Figure 2:
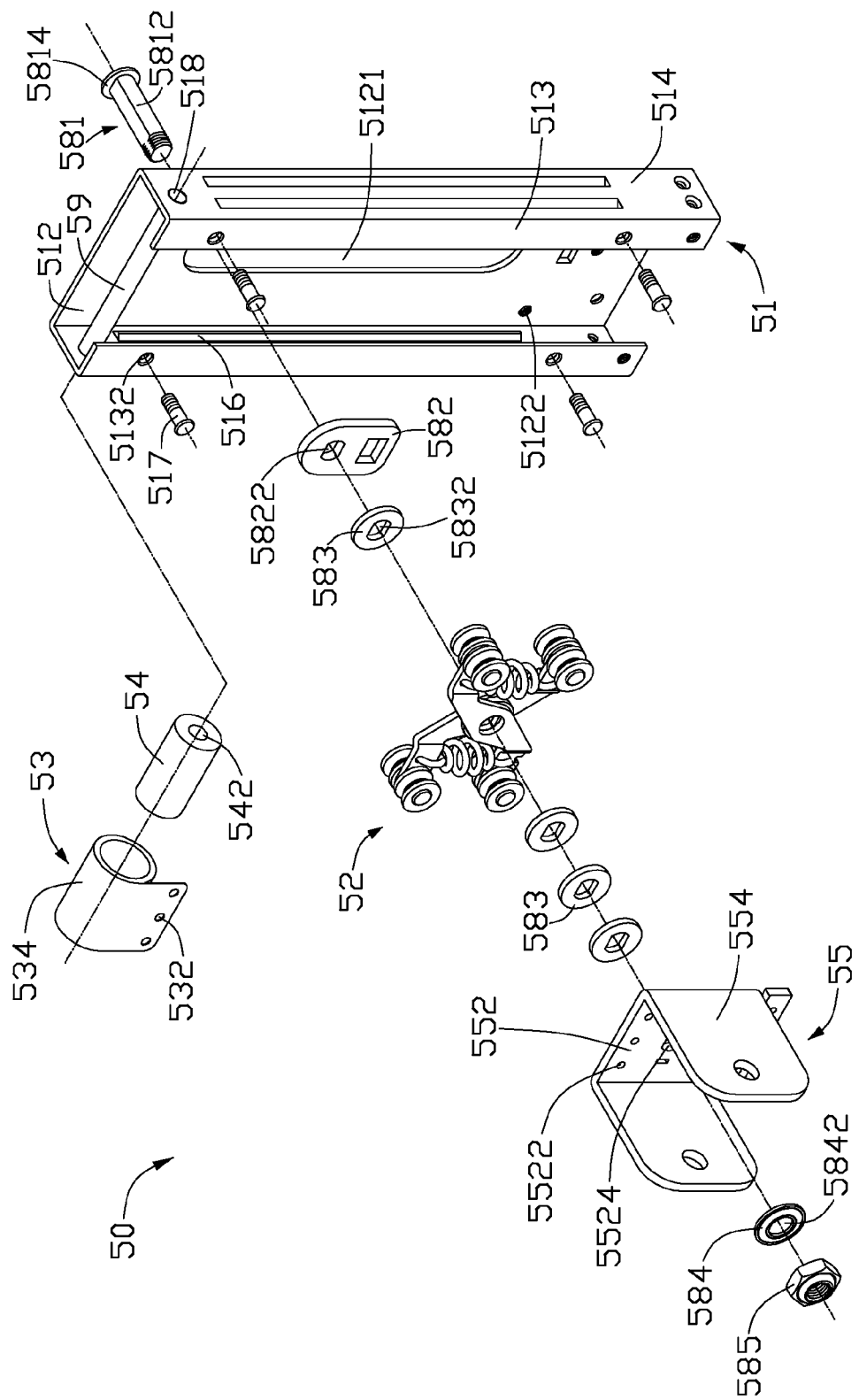
FIG. 2 is an exploded, isometric view of the adjustable support mechanism of FIG. 1.

Referring to FIG. 2, the adjustable support mechanism 50 includes a main bracket 51, an adjustable suspension member 52, an elastic member 53, a tube 54, a load support 55, an assembly module (not labeled), and a supporting pivot shaft 59.

The main bracket 51 includes a main sheet 512 and two side sheets 514 perpendicularly extending from opposite sides of the main sheet 512 correspondingly. Two limiting flanges 513 are formed from edges of the side sheets 514 correspondingly. The limiting flanges 513 face each other and are parallel to the main sheet 512. The main sheet 512 defines a guide slot 5121 and a plurality of threaded holes 5122. Each side sheet 514 forms two parallel guide rails 516. In this embodiment, the guide rails 516, formed by punching machine, are V-shaped protrusions extending inwards from the main bracket 51. An end of each side sheet 514 defines a support shaft hole 518. Each limiting flange 513 defines two through holes 5132 adjacent to opposite ends correspondingly. Four limiting members 517 protrude through the through holes 5132 and engage the threaded holes 5122 correspondingly, thus preventing the adjustable suspension member 52 from sliding beyond a scope defined by the limiting members 517.

Figure 3:
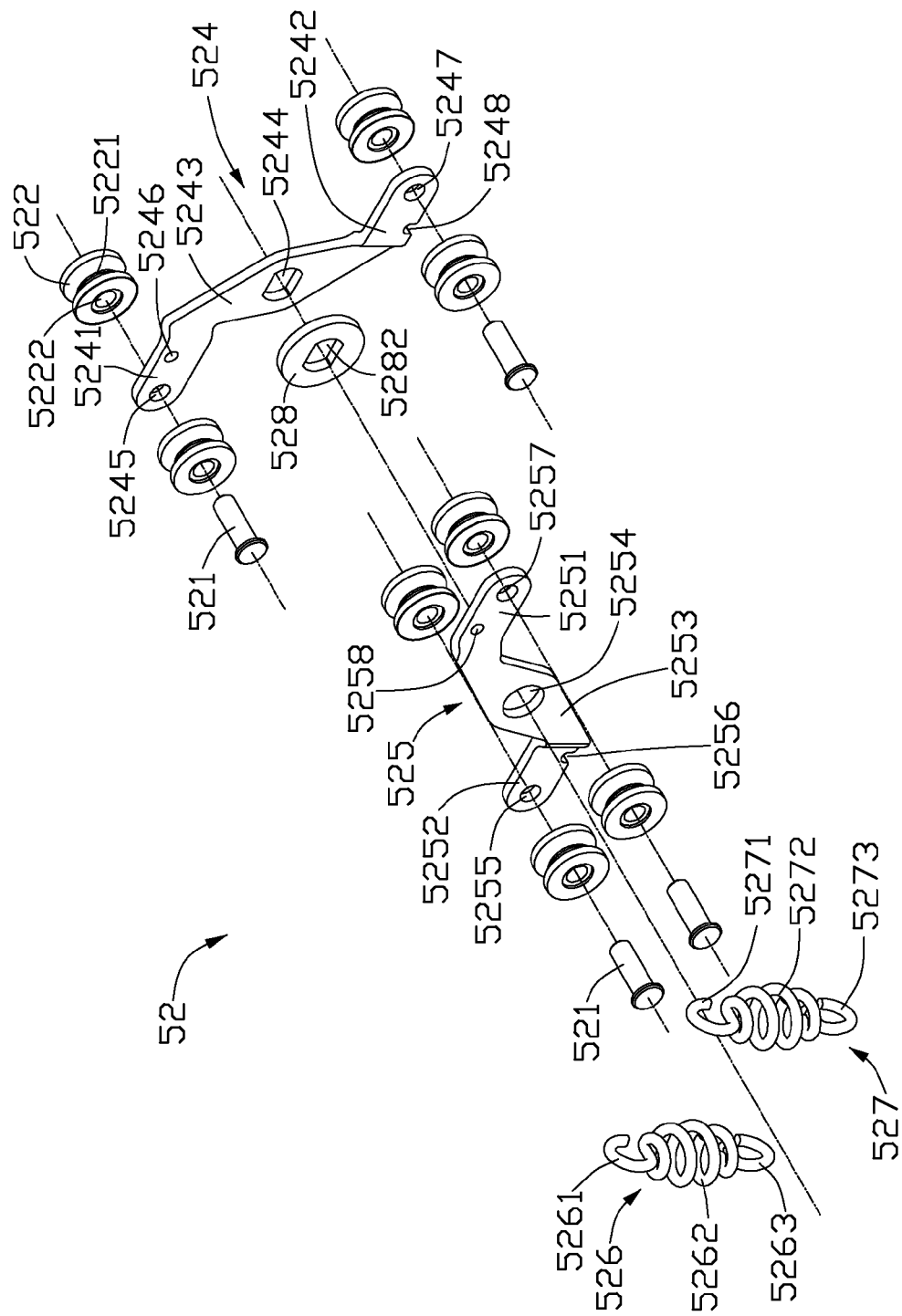
FIG. 3 is an exploded, isometric view of an adjustable suspension member of the adjustable support mechanism of FIG. 2.
Figure 4:
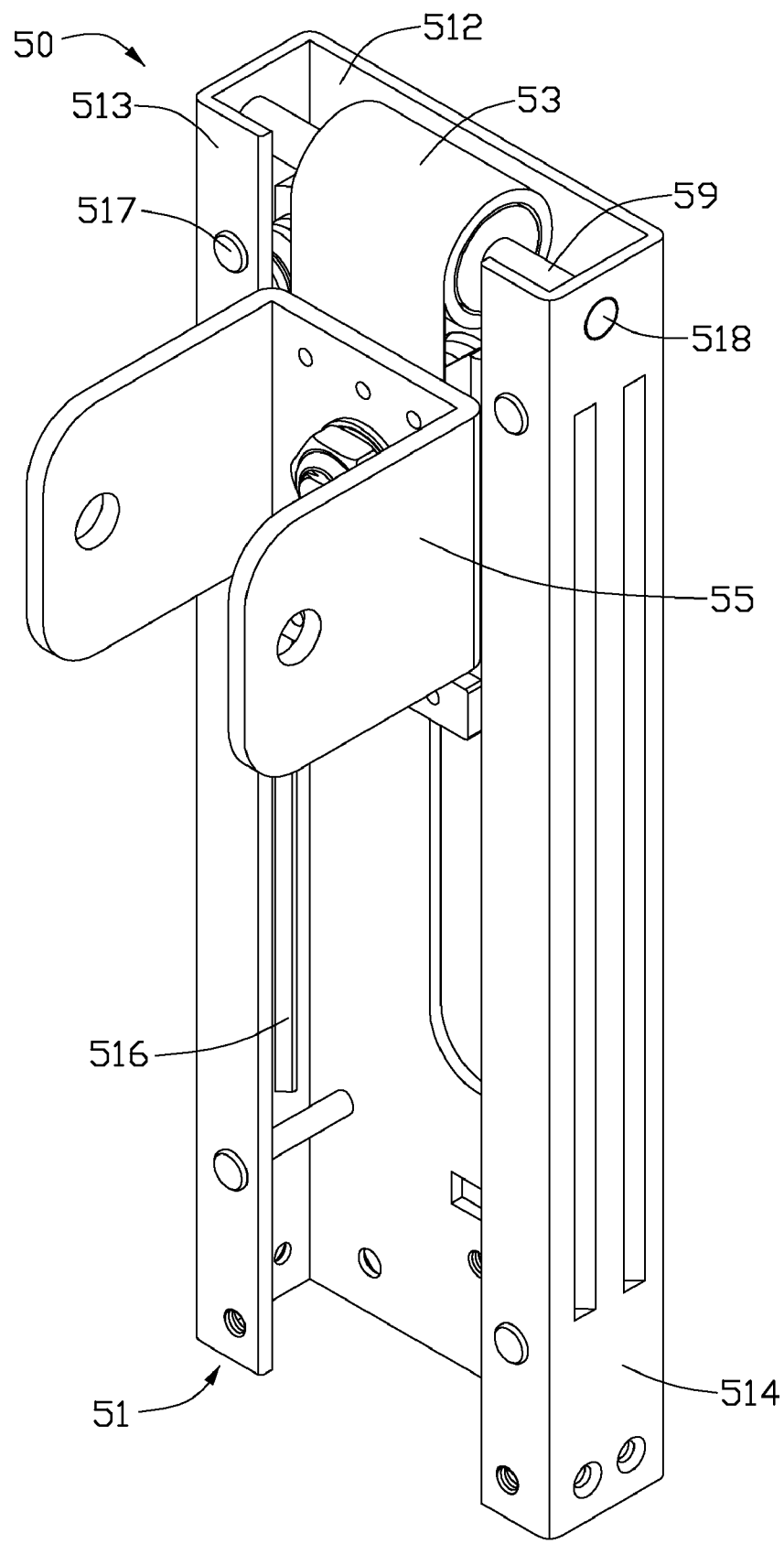
FIG. 4 is an assembled, isometric view of the adjustable support mechanism of FIG. 2.
Figure 5:
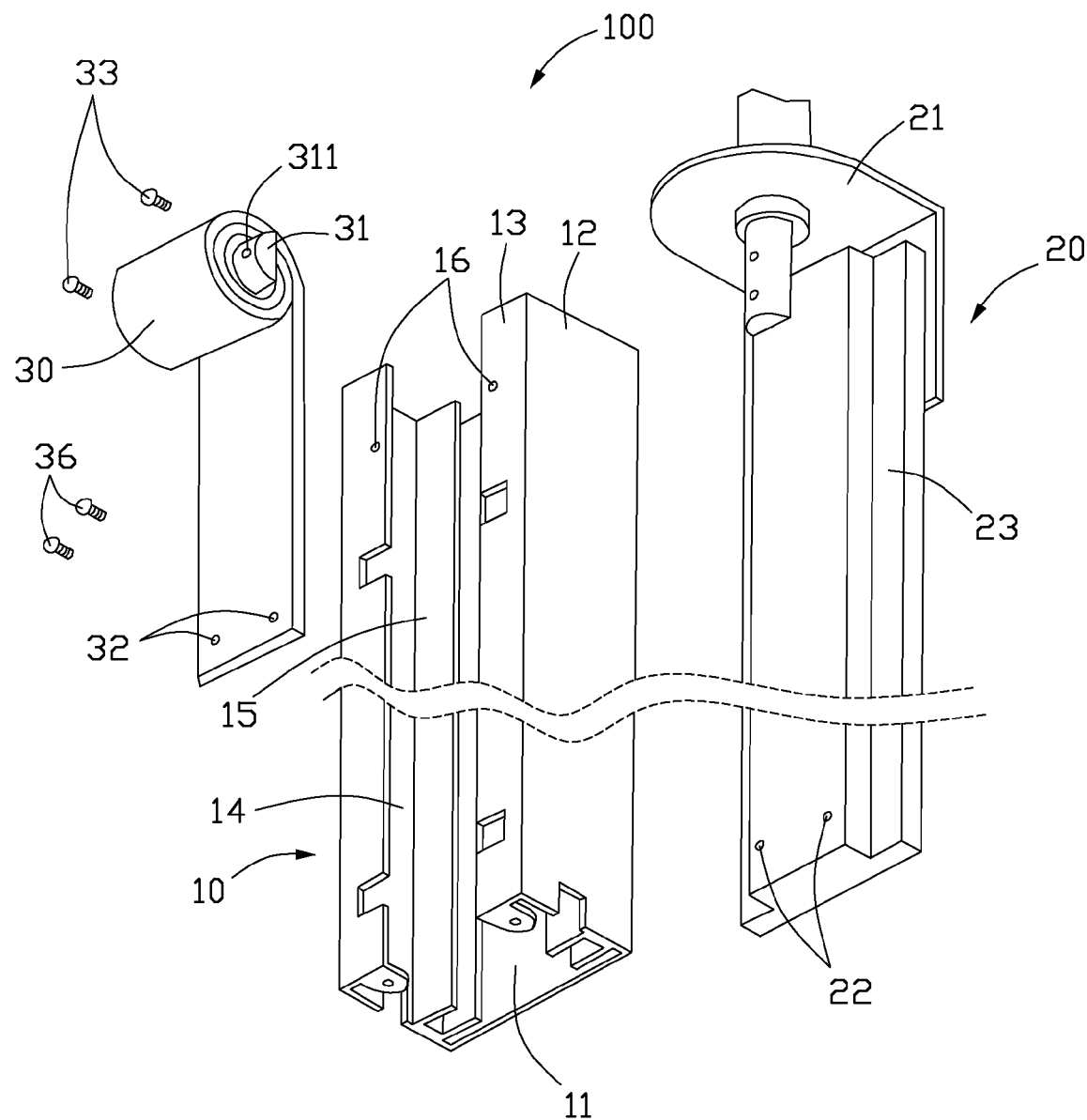
FIG. 5 is an exploded, isometric view of a conventional adjustable support mechanism.

Referring to FIG. 3, the adjustable suspension member 52 includes four rotatable wheel shafts 521, eight wheels 522, a first suspension frame 524, a second suspension frame 525, a first stretching member 526, a second pulling member 527, and a washer 528.

The wheels 522 are made of plastic with high abrasive resistance. Each wheel 522 defines a circular hole 5222 in the center and a groove 5221 around the circular edge of the wheel 522 for engaging one corresponding guide rail 516 of the side sheets 514 correspondingly. The first stretching member 526 is a tension spring including two hooks 5261, 5263, and a coiled portion 5262. The hooks 5261, 5263 extend from two opposite ends of the coiled portion 5262. The second stretching member 527 is a tension spring including two hooks 5271, 5273, and a coiled portion 5272. The hooks 5271, 5273 are extended at two opposite ends of the coiled portion 5272.

The first suspension frame 524 includes a first arm 5241, a second arm 5242, and a connecting portion 5243 connecting the arms 5241, 5242. Joints between the arms 5241, 5242 and the connecting portion 5243 have a stretched Z-shape. The connecting portion 5243 defines a non-circular assembly hole 5244 in the center. The first arm 5241 defines a wheel hole 5245 in an end away from the connecting portion 5243 and a hook hole 5246 between the wheel hole 5245 and the connecting portion 5243. The second arm 5242 defines a wheel hole 5247 in an end away from the connecting portion 5243 and a hook notch 5248 at an edge.

The second suspension frame 525 includes a first arm 5251, a second arm 5252, and a connecting portion 5253 connecting the same. Joints between the arms 5251, 5252 and the connecting portion 5253 have a stretched Z-shape. The connecting portion 5253 defines a circular assembly hole 5254 in the center. The arm 5251 defines a wheel hole 5257 in an end away from the connecting portion 5253 and a hook hole 5258 between the wheel hole 5257 and the connecting portion 5253. The arm 5252 defines a wheel hole 5255 in an end away from the connecting portion 5253 and a hook notch 5256 at an edge.

The washer 528 is configured to be disposed between the first suspension frame 524 and the second suspension frame 525. The washer 528 further defines a non-circular wheel hole 5282.

During assembly of the adjustable suspension member 52, as seen in FIG. 3, each rotatable wheel shaft 521 rotatably protrudes through the circular holes 5222 of two wheels 522 and one of the wheel holes 5245, 5247, 5255, 5257 of the arms 5241, 5242, 5251, 5252 correspondingly, thus mounting the wheels 522 onto the first suspension frame 524 and the second suspension frame 525 correspondingly. Two wheels 522 are disposed at two sides of each of the arms 5241, 5242, 5251, 5252 correspondingly. The hook 5261 of the first stretching member 526 engages the hook hole 5246 of the first suspension frame 524 and the hook 5263 of the first stretching member 526 engages the hook notch 5256 of the second suspension frame 525. The hook 5271 of the second stretching member 527 engages the hook hole 5258 of the second suspension frame 525 and the hook 5273 of the second stretching member 527 engages the hook notch 5248 of the first suspension frame 524. As such, the adjustable suspension member 52 has been assembled. Beforehand, the first and second stretching members 526, 527 are in a tension state, providing a pulling force that brings the first suspension frame 524 and the second suspension frame 525 together to bring the first arm 5241 near to the second arm 5252 and the second arm 5242 near to the first arm 5251.

Referring to FIG. 2 again, the elastic member 53 is a coil spring defining a plurality of connecting holes 532 at one end, and forming a coiled portion 534 from an opposite end. The tube 54 defines an engaging hole 542 extending from one end surface to an opposite end surface.

The load support 55 includes a connecting plate 552 and two side plates 554 formed at opposite ends of the connecting plate 552 correspondingly. The connecting plate 552 defines a plurality of connecting holes 5522 corresponding to the connecting holes 532 of the elastic member 53. The load support 55 further defines a non-circular assembly hole 5524 in the center thereof.

The assembly module includes a slidable shaft 581, a fixing piece 582, a plurality of washers 583, a resilient member 584, and a nut 585. The fixing piece 582 defines a non-circular assembly hole 5822. The fixing piece 582 is wider than the guide slot 5121 of the main bracket 51. Each washer 583 defines a non-circular assembly hole 5832. The slidable shaft 581 includes a shaft portion 5812 and a flange 5814 formed at an end of the shaft portion 5812. The shaft portion 5812 has a cross-section corresponding to the shape of the assembly holes 5822, 5832, 5524. The resilient member 584 defines a circular hole 5842.

During assembly of the adjustable support mechanism 50, the assembly of the adjustable suspension member 52 slides into the main bracket 51 from an upper open end of the main bracket 51. As such, the grooves 5221 of the wheels 522 engage the guide rails 516 of the main bracket 51 correspondingly. The pulling force of the first and second stretching members 526, 527 forces the wheels 522 of the adjustable suspension member 52 to tightly engage with the main bracket 51, thus maintaining the adjustable suspension member 52 in any position. The limiting members 517 enter the through holes 5132 and the threaded holes 5122 correspondingly. The slidable shaft 581 runs through the guide slot 5121 of the main bracket 51, the fixing piece 582, one of the washers 583, the assembly hole 5244 of the first suspension frame 524, the assembly hole 5254 of the second suspension frame 525, three of the washers 583, the assembly hole 5524 of the load support 55, and the resilient member 584, and then engages the nut 585. As such, the slidable shaft 581, the fixing piece 582, the washers 583, the load support 55, the first suspension frame 524 and the nut 585 are non-rotatable relative to each other, as are the second suspension frame 525 and the resilient member 584. The first suspension frame 524 and the second suspension frame 525 are rotatable relative to each other. The tube 54 is inserted into the coiled portion 534 of the elastic member 53. The supporting pivot shaft 59 runs through one of the support shaft holes 518, the engaging hole 542 of the tube 54 received in the elastic member 53 and another support shaft hole 518, in that order. One end of the elastic member 53 is fixed to the load support 55 by engagement of a plurality of bolts (not shown) in the connecting holes 532 of the elastic member 53 and the connecting holes 5522 of the load support 55. The load support 55 is configured for supporting the display screen 41.

If the height of the display screen 41 needs to be adjusted, external force applied forces the display screen 41 to slide relative to the main bracket 51. When the adjustable suspension member 52 slides relative to the main bracket 51, the wheels 522 move along the guide rails 516. The external force is released when the display reaches a predetermined height. A static friction force is created between the wheels 522 and the guide rails 516 via a rotating trend of the first suspension frame 524 relative to the second suspension frame 525 resulting in friction between the wheels 522 and the guide rails 516. The adjustable suspension member 25 together with the load support 55 and the display screen 41 remains in the predetermined position by composition force of the static friction force, an elastic force of the elastic member 52, and the total gravitational force of the adjustable suspension member 25, the load support 55, and the display screen 41 is zero. The elastic force substantially equals the total gravitational force. Thus, a height of the display screen 41 can be easily adjusted by overcoming the static friction force.

It can be seen that even if the adjustable support mechanism 50 is used for a period of time and the wheels 522 and the guide rails 516 are abraded, the static friction force is retained due to the pulling force of the first and second stretching members 526, 527 rotating the first suspension frame 524 relative to the second suspension frame 525 and the wheels 522 continuing to tightly engage the guide rails 516 of the main bracket 51. Thus, the adjustable support mechanism 50 has a long lifespan. In addition, the adjustable suspension member 52 is small and light, such that the adjustable support mechanism 50 is correspondingly light.

Alternatively, the first and second stretching members 526, 527 may be elastic rubber sticks. The adjustable support mechanism 50 may include a single stretching member or more than two stretching members. Each side sheet 514 of the main bracket 51 may include a single guide rail 516 or more than two guide rails 516. The limiting member 517 may directly formed on the main bracket 51.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. An adjustable support mechanism for a display, comprising:
    a main bracket forming at least two guide rails including a first guide rail and a second guide rail disposed opposite to each other;
    an adjustable suspension member slidably mounted to the main bracket, the adjustable suspension member comprising two crossed connected suspension frames, at least two wheels, and at least one stretching member, the suspension frames rotatably connected to each other, the at least two wheels disposed at ends of the suspension frames, each of the first and second guide rails engaging at least one wheel, two ends of each of the at least one stretching member connected to the suspension frames correspondingly, and the at least one stretching member configured for pulling the wheels to tightly engage the guide rails of the main bracket; and
    an elastic member having two ends fixedly connected relative to the main bracket and the adjustable suspension member correspondingly.

2. The adjustable support mechanism as claimed in claim 1, wherein the main bracket comprises at least two limiting members disposed at two ends of the main bracket for preventing the adjustable suspension member from sliding out of the main bracket.

3. The adjustable support mechanism as claimed in claim 2, wherein the main bracket includes a main sheet and two side sheets extending substantially perpendicularly from opposite sides of the main sheet correspondingly, with the at least two guide rails formed on the side sheets.

4. The adjustable support mechanism as claimed in claim 3, wherein at least two guide rails, formed by punching machine, are V-shaped protrusions extending inwards of the main bracket.

5. The adjustable support mechanism as claimed in claim 3, wherein a limiting flange is formed from an edge of each side sheet parallel to the main sheet, and each limiting flange defines two through holes at opposite ends correspondingly, the main sheet defines a plurality of threaded holes, the number of the at least two limiting members is four, and the limiting members run through the through holes and engage with the threaded holes correspondingly.

6. The adjustable support mechanism as claimed in claim 3, wherein the adjustable support mechanism further comprises a load support and an assembly module, the assembly module includes a slidable shaft, and a fastening member, the main sheet defines a guide slot, the slidable shaft runs through the guide slot, the suspension frames, the load support, and engages the fastening member, the slidable shaft, one of the suspension frames and the load support are non-rotatable relative to each other.

7. The adjustable support mechanism as claimed in claim 6, wherein an end of each side sheet defines a support shaft hole, the adjustable support mechanism further comprises a tube and a supporting pivot shaft, the supporting pivot shaft runs through one of the support shaft holes, an engaging hole of the tube received in the elastic member and another support shaft hole, in that order, an end of the elastic member is fixed to the load support.

8. The adjustable support mechanism as claimed in claim 3, wherein the number of the at least two guide rails is four, each two of the four guide rails are formed at the side sheets correspondingly, the number of the at least two wheels is eight, the two suspension frames are a first suspension frame and a second suspension frame, and the at least one stretching member includes a first stretching member and a second stretching member.

9. The adjustable support mechanism as claimed in claim 8, wherein the wheels are made of plastic with high abrasive resistance, each wheel defines a groove in the sidewall for engaging the guide rails of the main bracket, the each of the first and second stretching members is a tension spring including two hooks, each of the first and second suspension frames includes two arms and a connecting portion for connecting the arms, one of the arms of each suspension frame defines a hook hole, the other arm of each suspension frame defines a hook notch at an edge, two wheels are connected to ends of the arms of the suspension frames, the hooks of the first stretching member engage the hook hole of the first suspension frame and the hook notch of the second suspension frame correspondingly, the hooks of the second stretching member engages the hook hole of the second suspension frame and the hook notch of the first suspension frame correspondingly.

10. The adjustable support mechanism as claimed in claim 9, wherein the slider member further comprises a washer configured to be disposed between the suspension frames.

11. The adjustable support mechanism as claimed in claim 9, wherein the adjustable suspension member further comprises four rotatable wheel shafts, each rotatable wheel shaft runs through two wheels and one of the arms, thus mounting the wheels onto the first suspension frame and the second suspension frame.

12. The adjustable support mechanism as claimed in claim 1, wherein each of the at least one stretching member is a tension spring.

13. An adjustable support mechanism comprising:
a main bracket;
an adjustable suspension member slidably mounted to the main bracket, the adjustable suspension member comprising two crossed connected suspension frames and at least one stretching member, the suspension frames rotatably connected to each other, two ends of each of the at least one stretching member connected to the suspension frames correspondingly, and the at least one stretching member configured for providing a pulling force to make ends of the suspension frames tightly engaging the main bracket; and
an elastic member having two ends fixedly connected relative to the main bracket and the adjustable suspension member correspondingly.

14. The adjustable support mechanism as claimed in claim 13, wherein each of the at least one stretching member is a tension spring.

* * * * *